United States Patent
Molen et al.

(10) Patent No.: US 7,474,617 B2
(45) Date of Patent: Jan. 6, 2009

(54) DETECTION OF MULTIPLE USERS OF A NETWORK ACCESS NODE

(75) Inventors: Brett Thomas Molen, West Jordan, UT (US); Darrell Richard Burns, Kaysville, UT (US); Douglass Ervan Burns, Kaysville, UT (US); Nichol Fife Draper, West Jordan, UT (US); Richard L. Ehlers, Park City, UT (US)

(73) Assignee: IBahn General Holdings Corporation, South Jordan, UT (US)

( * ) Notice: Subject to any disclaimer, the term of this patent is extended or adjusted under 35 U.S.C. 154(b) by 510 days.

(21) Appl. No.: 11/073,428

(22) Filed: Mar. 4, 2005

(65) Prior Publication Data

US 2006/0198311 A1 Sep. 7, 2006

(51) Int. Cl.
*G08C 15/00* (2006.01)
(52) U.S. Cl. ............... 370/232; 370/230; 370/252; 709/223; 709/225
(58) Field of Classification Search ......... 370/229–232, 370/235, 252, 253, 464–467, 469; 709/223–225, 709/232; 726/6, 7, 11, 22, 23
See application file for complete search history.

(56) References Cited

U.S. PATENT DOCUMENTS 6,115,393 A * 9/2000 Engel et al. ............. 370/469
6,771,646 B1 * 8/2004 Sarkissian et al. ......... 370/392
6,985,901 B1 * 1/2006 Sachse et al. ............. 707/10
7,246,101 B2 * 7/2007 Fu et al. .................. 706/46
7,266,602 B2 * 9/2007 Givoly ..................... 709/224
2004/0111507 A1 * 6/2004 Villado et al. ............. 709/224
2007/0124802 A1 * 5/2007 Anton et al. .............. 726/3

FOREIGN PATENT DOCUMENTS

EP 1294156 A2 * 3/2003
WO WO 03065186 A1 * 8/2003

OTHER PUBLICATIONS

Marzolla, M., "A Performance Monitoring System for Large Computing Clusters," Eleventh Euromicro Conference on Parallel, Distributed and Network-Based Processing, 2003. Feb. 5-7, 2003. pp. 393-400.*

* cited by examiner

*Primary Examiner*—Chi H Pham
*Assistant Examiner*—Donald L Mills
(74) *Attorney, Agent, or Firm*—Weaver Austin Villeneuve & Sampson LLP

(57) ABSTRACT

Techniques are described for detecting use of a network access node by multiple users to gain access to a network. Packets are received from a network device in communication with the network access node. The packets are evaluated with reference to a plurality of metrics. Each of the metrics is independently representative of an estimated number of user devices from which the packets originate.

23 Claims, 2 Drawing Sheets

DETECTION OF MULTIPLE USERS OF A NETWORK ACCESS NODE

BACKGROUND OF THE INVENTION

The present invention relates to the monitoring and evaluation of traffic in a computer network and, specifically, to the detection of the use of a single network access node by multiple users.

There are a variety of techniques by which multiple computers may gain access to a network through a single network access node. For example, a single device (e.g., a router) can employ network address translation (NAT) and port address translation (PAT) to translate the media access control (MAC) address and/or IP addresses of multiple connected devices which makes it appear as though all transmitted packets are originating from the single device. In other approaches, a single client device can use NAT and/or PAT, or act as a proxy for other client devices.

It will be understood that such techniques are advantageous for efficiently using scarce network resources. On the other hand, such techniques may also be employed to circumvent attempts by service providers and network operators to bill individual users for access to their networks. That is, because most such networks authenticate users based on the MAC address, multiple users may gain network access by purchasing a single connection and, in effect, sharing a single MAC and IP address.

It is therefore desirable to provide techniques for detecting when multiple users are gaining access to a network through a single network access node.

SUMMARY OF THE INVENTION

According to the present invention, methods and apparatus are provided for detecting use of a network access node by multiple users to gain access to a network. According to a specific embodiment, packets are received from a network device in communication with the network access node. The packets are evaluated with reference to a plurality of metrics. Each of the metrics is independently representative of an estimated number of user devices from which the packets originate.

According to another specific embodiment, a network is provided including a network access node for facilitating access to the network by a first network device. A second network device is operable to detect use of the network access node and the first network device by multiple users to gain access to the network. The second network device (which may be, for example, a gateway) is operable to receive packets from the first network device via the network access node, and evaluate the packets with reference to a plurality of metrics. Each of the metrics is independently representative of an estimated number of user devices from which the packets originate.

A further understanding of the nature and advantages of the present invention may be realized by reference to the remaining portions of the specification and the drawings.

DETAILED DESCRIPTION OF SPECIFIC EMBODIMENTS

Figure 1:
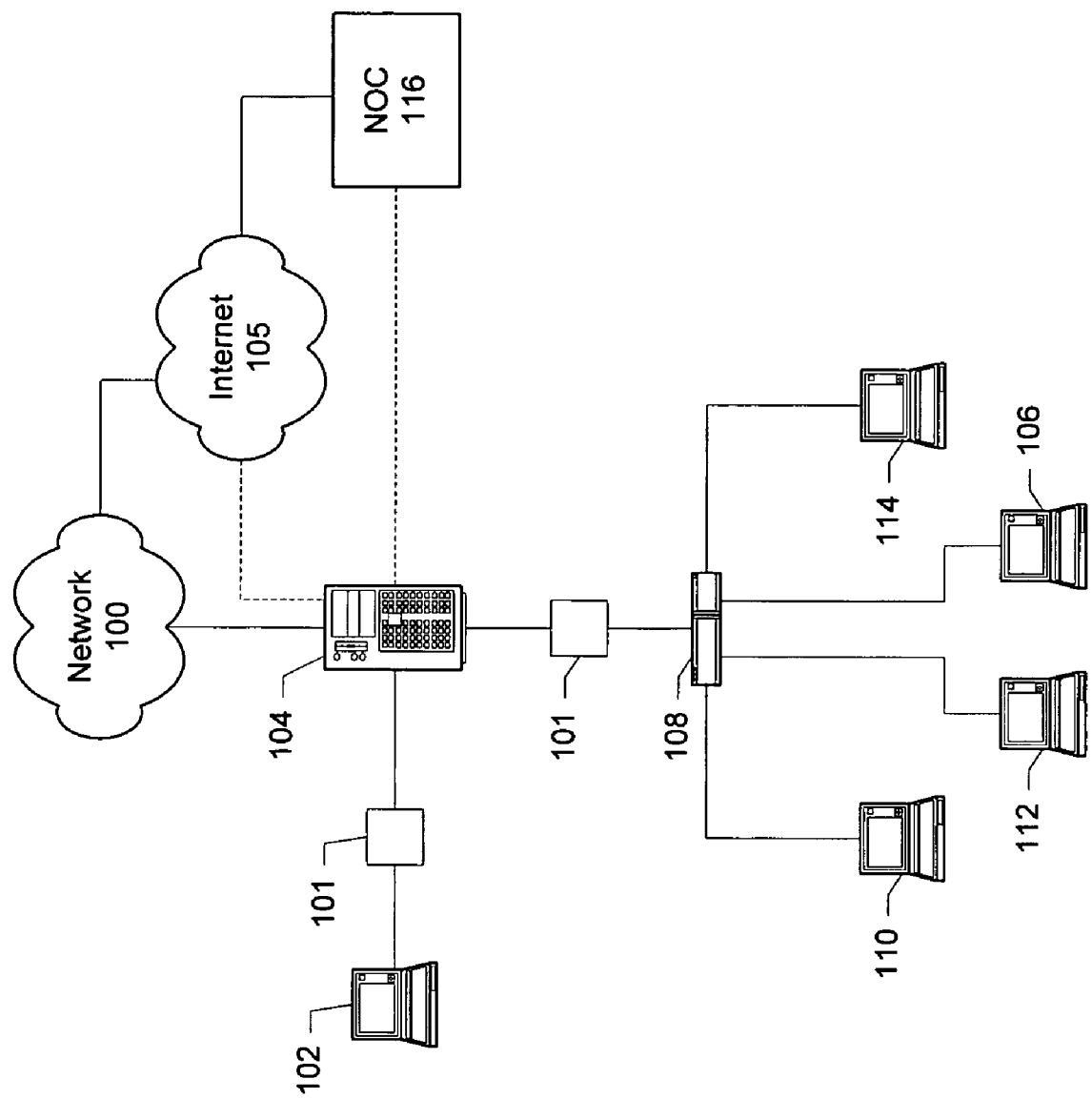
FIG. 1 is a simplified diagram of an exemplary network environment in which embodiments of the present invention may be implemented.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

The present invention enables services providers (e.g., ISPs) and network operators to determine whether there are multiple users associated with a particular MAC address on their networks. By evaluating traffic for each MAC address which has authenticated on the network, the invention can identify usage patterns which deviate from the expected usage patterns of a single user.

Specific embodiments of the invention evaluate different types of network traffic from particular MAC and/or IP addresses with respect to a variety of metrics to make this determination. For example, the number of connections for specific types of traffic originating from a particular MAC address may be tracked and, when some threshold number of connections is reached or exceeded, a flag indicating multiple users can be set or some action taken. A number of different traffic types and connection types may be monitored for this purpose including, for example, TCP, POP3, SMTP, raw sockets, user agents, etc.

Another metric which may be monitored passively and which may be indicative of multiple users on a single MAC address is the number of different web browsers being employed in the data traffic coming from the address. Yet another is the number of different operating systems being employed in the data traffic coming from the address.

In addition to the passive evaluation of network traffic, more "active" or intrusive evaluations or checks may be performed to determine whether multiple users are "behind" a single MAC address. For example, unique cookies may be transmitted to devices transmitting packets on the network. By checking these cookies, it can be determined whether multiple devices are associated with a single MAC address. Similarly, Netbios probes may be employed to determine whether multiple devices are behind a single MAC address.

According to some embodiments, the results of different evaluations of the traffic from a particular MAC address are combined to make the determination. According to one exemplary embodiment, the number of connections for multiple types of traffic (e.g., TCP, POP3, and SMTP) are monitored, and it is only when flags are set for more than one type of traffic that any action is taken. Such an approach may be advantageous in that it enhances the reliability of the determination.

According to some embodiments, action may be precipitated only after a multi-stage evaluation is made. That is, for example, a flag may be set as described above with reference to the number of connections originating from a particular MAC address for one or more types of traffic. However, instead of precipitating termination of access to the network from that MAC address, one or more additional evaluations (e.g., cookie checking, Netbios probes) may be performed to further enhance the reliability of the determination. It should be understood with reference to the foregoing that many different approaches are within the scope of the invention.

FIG. 1 is a network diagram of an exemplary network in which embodiments of the present invention may be implemented. In one such implementation, network 100 represents a wireless network "hot spot" in which users pay individually for access such as might be found on a hotel property or in a so-called Internet café. Alternatively, network 100 may represent an Internet service provider (ISP) network with which subscribers communicate via some type of modem (e.g., cable, DSL, etc.), and an infrastructure which may be wired, wireless, or combinations of both, and may include, for example, the phone system. In any case, it should be understood that the invention may be implemented in a wide variety of network environments, many of the details of which are not particularly relevant to the invention.

When a user device 102 connects with network 100, e.g., by plugging a laptop into an Ethernet port or by moving into a wireless hot spot, it may transmit an ARP request looking for MAC address of the gateway on its home network. The network access nodes by which devices may connect with network 100, whether wired or wireless, are represented by access nodes 101. Regardless of the computer's settings, gateway 104 performs ARP spoofing, returning its MAC address instead of the requested MAC address. User device 102 then starts sending packets to gateway 104 as if it were the requested gateway.

According to various specific embodiments, gateway 104 may comprise, for example, the HEP 502 from STSN of Salt Lake City, Utah, or the USG II from Nomadix of Newbury Park, Calif. It should be noted, however, that a wide variety of network device types and groups of network devices may be configured to perform the described functionality of such a gateway without departing from the scope of the invention.

In addition, according to various embodiment, access nodes 101 may support DSL, PNA, and Ethernet solutions, as well as a variety of Wi-Fi-based solutions. For example, the Catalyst 2950-24 LRE Switch from Cisco Systems of San Jose, Calif. (wired example), or the CN320 from Colubris Networks of Waltham, Mass. (wireless example). Of course, it will be understood that a wide variety of devices are suitable for implementing the described functionality.

If device 102 already has an IP address (e.g., either a static or a cached DHCP address from its home network), a private IP address is obtained from a pool associated with network 100, and network address translation (NAT) is performed by gateway 104 on a packet-by-packet basis between the IP address of device 102 and the private IP address from the network pool. The translated packets are then sent out on network 100. Gateway 104 performs a reverse of this NAT on packets directed back to device 102 from the network.

On the other hand, if packets transmitted from device 102 correspond to a DHCP request, gateway 104 provides a private IP address to device 102 which is a valid IP address on network 100. Device 102 thereafter uses that IP address as the source address in subsequently transmitted packets. Gateway 104 continues to intercept the subsequently transmitted packets to determine whether a NAT needs to be done. However, when it recognizes the IP address as one from its pool, it simply passes the packet through without translation.

Regardless of how device 102 gains access to network 100, access to the Internet (represented by network cloud 105) may be facilitated using a further NAT from the locally valid IP address to a public IP address drawn from a pool of such addresses owned by or associated with network 100. In FIG. 1, the connection to Internet 105 is shown via gateway 104. It will be understood, however, that this is merely exemplary and that access to the Internet may be facilitated by or in conjunction with additional devices on the network, e.g, a proxy server or via a remote NOC.

As will be seen, the continued interception of all packets on the network by gateway 104 is advantageous for implementing specific embodiments of the invention in that it allows for the centralized monitoring of traffic as described herein. However, it should be noted that such centralized monitoring is not essential for practicing the invention. That is, a more distributed approach may be employed.

Authentication, i.e., determining whether a computer is entitled to access network 100, occurs at the application and data link layers. That is, in addition to the NAT or DHCP processes discussed above, gateway 104 checks the MAC address for each packet to determine whether the transmitting computer has previously authenticated on the network. If so, the packet is allowed onto the network (with any necessary NAT). If not, the packet is redirected to an authentication web page where the user attempting to access the network can purchase the system (e.g., in the case of HTTP traffic), or an error message is transmitted to the user device indicating that the user has not authenticated (e.g., in the case of Telnet). Once the device has authenticated it may then transmit packets on the network.

Referring again to FIG. 1, a device 106 may authenticate in network 100 via an intervening router 108 which is configured to replace the MAC address in packets transmitted by device 106 with its own MAC address. Thus, when subsequently determining whether packets received from device 106 are coming from an authenticated device, gateway 104 looks at the MAC address of router 108 rather than that of device 106. As discussed above, the fact that any packets using the MAC address of router 108 are considered to have originated from an authenticated device allows other devices (e.g., 110, 112, and 114) to transmit packets on network 100 via router 108 without separately authenticating. This may also be accomplished by having one of devices 106, 110, 112, and 114 perform NAT and or act as a proxy for the others (which would require directing all of the traffic through the one device).

Figure 2:
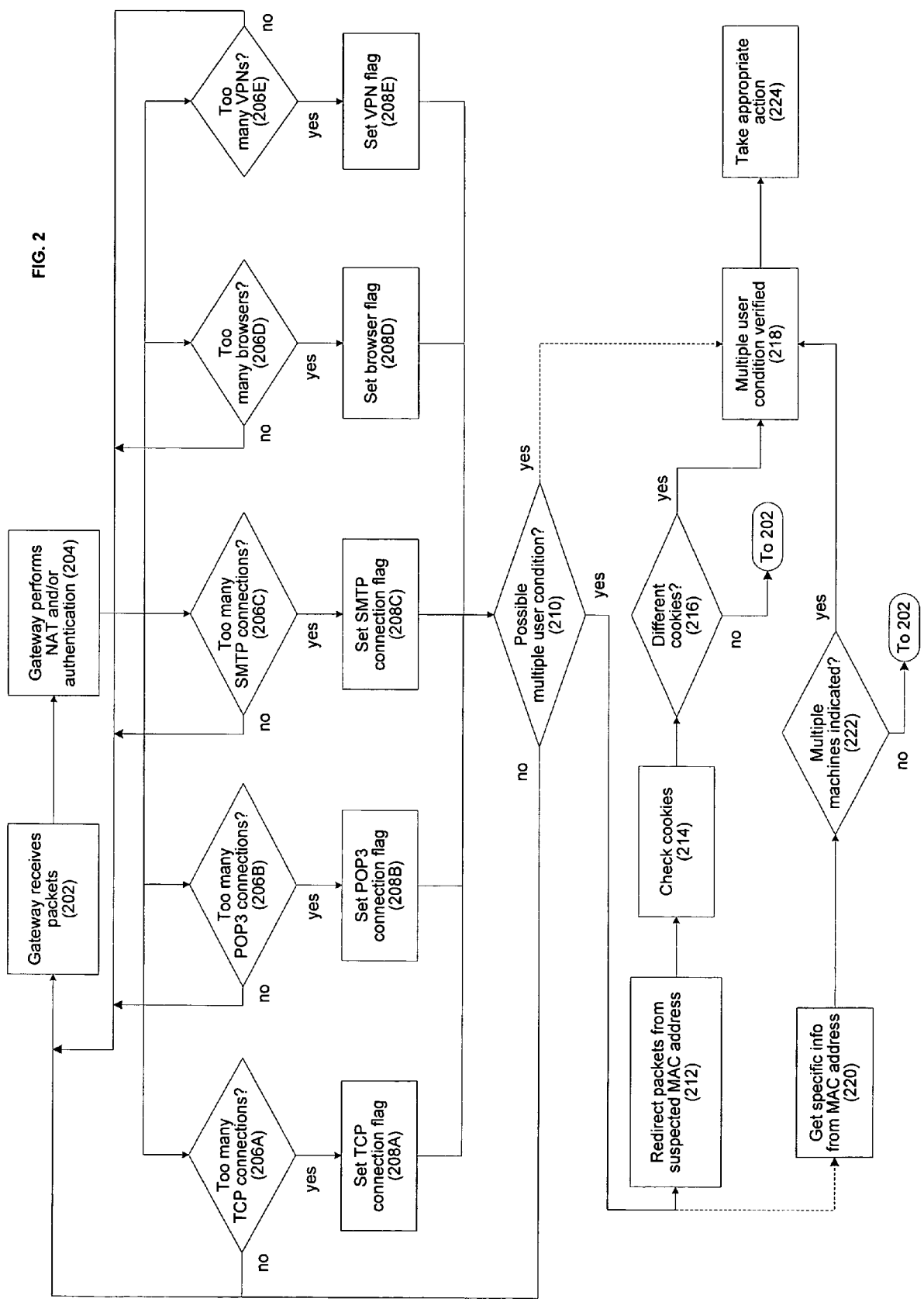
FIG. 2 is a flowchart illustrating a specific embodiment of the invention.

FIG. 2 is a flowchart illustrating a specific embodiment of the invention which will be described with reference to the network diagram of FIG. 1. The following description assumes that devices 102 and 106 have authenticated on network 100, with device 106 communicating with network 100 via router 108 as described above. The following description also contemplates a two-stage process in which one or more "passive" monitoring techniques may be followed by one or more relatively more intrusive or resource consumptive techniques. As devices 102 and 106 transmit packets on the network, gateway 104 receives each packet (202) and performs the NAT and authentication processing described above (204). Gateway 104 also "passively" monitors the traffic, e.g., on a packet by packet basis, with respect to one or more parameters to detect a possible multiple user condition. As used herein, the term "passive" refers to techniques by which the gateway merely examines and records information in particular fields in data packets, thereby introducing little or no latency into the packet flow.

According to one implementation, gateway 104 tracks the number of connections for at least one type of traffic (e.g., TCP, UDP, POP3, SMTP, ICMP, raw sockets, etc.) for each MAC address it encounters. The type of traffic may be identified from the corresponding port number (TCP at port 80, POP3 at port 110, SMTP at port 25, etc.). Different connections via the same port number may be identified from the IP address to which the packet is directed. According to one embodiment, the number of concurrently open TCP connections are tracked and compared to an expected number of TCP connections for an average user in a given session, e.g., 10-20. This expected number may be modified according to the usage patterns in a given network or population of users. This may be done manually or automatically (e.g., dynamically in response to current traffic conditions).

If the number of TCP connections for a given MAC address exceeds the expected number (206A), a flag is set which indicates that multiple machines might be sharing a MAC address on the network (208A). According to some embodiments, the number of connections for different types of traffic (e.g., the number of different servers for POP3, SMTP, etc.) are tracked simultaneously. This is indicated by the corresponding paths in parallel with 206A and 208A in FIG. 2, each of which represents the monitoring of a different type of traffic. By referring to a combination of these metrics, determination of the multiple user condition may be made more reliable.

Identification of a possible multiple user condition with reference to the number of connections for a given type of traffic may be accomplished in a number of ways. For example, if the expected number of connections for a session is N, the flag might be set when the number of actual connections exceeds some multiple of N, e.g., 2N or 3N. According to a specific embodiment, the number of actual connections is periodically divided by the expected number of connections to get an estimate of the number of users associated with a particular MAC address. When the estimated number of users reaches some threshold, e.g., 2, the flag may be set. Such an approach has the advantage of also tracking the estimated number of users which, in some embodiments, may be used in determining the action to be taken.

The ability to determine and track an estimated number of users may also be useful for implementations in which the authorized number of users for a given MAC address is more than one. That is, embodiments are envisioned in which a group of users may be authorized to share a single access node. In such cases, it is advantageous to be able to estimate the actual number of users at an access node to detect when this actual number exceeds the authorized group size. It is therefore desirable to be able to reliably distinguish between, for example, five users (e.g., the authorized group size) and seven users.

Other "passive" monitoring techniques may also be employed to identify the multiple user condition and/or facilitate estimation of the actual number of users. For example, the number of browser programs associated with the traffic from a single MAC address may be identified (see FIG. 2). That is, by passively looking at the HTML or HTTP headers (e.g., the header value user agent) associated with the traffic from each MAC address, it is possible to determine that different browser applications (e.g., Netscape Navigator, Internet Explorer, etc.) generated the headers. Alternatively, the use of different operating systems may be detected in a similar manner. Because users typically use a single browser program and a single operating system, the identification of multiple browsers and/or multiple operating systems for a single MAC address could be indicative of multiple users.

Another passive monitoring technique involves detecting traffic directed to multiple VPN ports or multiple VPN concentrator IP addresses. This approach is not as straightforward as, for example, tracking the number of POP3 connections in that different VPNs use different port numbers. However, VPN traffic is typically encrypted. Therefore, by identifying encrypted traffic (e.g., packets using standard encryption methods including, but not limited to, Secure Socket Layer (SSL), and packets using proprietary encryption protocols riding on the IP, TCP, or UDP layers) from a single MAC address (and/or IP address) which is directed to more than one port or VPN concentrator address, it is possible to at least tentatively identify a possible multiple user condition. Even simply tracking the number of encrypted streams could be used to detect the condition.

Some routers transmit spanning tree or routing protocol messages (e.g., RIP). Therefore, another passive monitoring technique which may be employed with various implementations relates to the detection of such messages.

Referring again to FIG. 2, when some number of the flags is set, a possible multiple user condition on the corresponding MAC address has been identified (210). In different implementations, this might mean that all of the flags or some number less than all of the flags. For example, if connection counts for four or five different types of traffic are being monitored, the multiple user condition might be detected where only two or three of the flags are set. Alternatively, a more sophisticated algorithm for combining the different flags may be employed. For example, the flags could be weighted differently in relation to previously measured reliability of each as an indicator of the multiple user condition.

Exemplary algorithms for detecting a multiple user condition could be as follows:
HTTP User Agent Method (HUAM):
  if (!UserAgentLinkedList.Find(UserAgent)) UserAgentLinkedList.Add(UserAgent);
TCP Port Counts Method (TCPM):
  if (TCP SYN SENT)
    if (TCP SYN-ACK RECEIVED) OpenTcpConnections++;
  if (TCP FIN or TCP RST RECEIVED) OpenTcpConnections--;
  if (OpenTcpConnections>MaxOpenTcpConnections) MaxOpenTcpConnections=OpenTcpConnections;
POP3 Destination Method (POPM):
  if (destination TCP Port==110)
    if (!Pop3DestinationLinkedList.Find(DestinationIP)) Pop3DestinationLinkedList.Add(DestinationIP);
SMTP Destination Method (SMTPM):
  if (destination TCP Port==25).
    if (!SMTPDestinationLinkedList.Find(DestinationIP)) SMTPDestinationLinkedList.Add(DestinationIP);
VPN Connections Method (VPNM):
  if (Ip Protocol !=1 (ICMP), 6 (TCP), 17 (UDP))
    if(!VPNDestinationLinkedList.Find(DestinationIP)) VPNDestinationLinkedList.Add(DestinationIP);

Exemplary algorithms for combining detection method results could be as follows:

EXAMPLE 1

Use the average of all the detection method results.
Number of users=((HUAM/2)+VPNM+POPM+(SMTPM/3)+(TCPM/15))/5

EXAMPLE 2

Take the result of each algorithm individually without adding them together:
(HUAM/2), VPNM,
POPM,
(SMTPM/3),
(TCPM/15)
From these, take the second highest result to ensure that at least two methods agree that there are multiple users.

In any case, once the multiple user condition is detected at 210, a second stage of the process may be initiated in which the result of 210 is verified with reference to one or more additional metrics. According to one embodiment, when a cookie-enabled machine is authenticated, the machine is "marked" with a unique cookie. Then, if the first stage of the process shown in FIG. 2 detects a possible multiple user condition, i.e., the result of 210 is positive, subsequent packets from the suspect MAC address are redirected to an HTTP page (212) which checks for these cookies (214). If different cookies are detected for the same MAC address (216), the multiple user condition will be considered to have been verified (218). Such an approach is suitable as a secondary check because it is more intrusive in that it may result in some latency experienced by the user. However, embodiments are contemplated in which such an approach is used as a primary check to detect multiple users.

According to various embodiments, information to verify a suspected multiple user condition may be acquired directly from the suspected MAC address (e.g., router 108 of FIG. 1) by sending probes or requests for specific data to that address (220). If the returned information indicates multiple users (222), the multiple user condition is verified (218). The dashed line from 210 to 220 indicates that such techniques may be employed as an alternative to or in conjunction with other techniques such as that described with reference to 212-216.

According to one such embodiment, when a possible multiple user condition has been flagged at 210, gateway 104 transmits a series of Netbios probes responsive to the traffic from the suspect MAC address. When a computer receives a Netbios probe the returned response typically includes, for example, the computer name. If there are multiple machines behind a suspected MAC address (e.g., devices 110, 112, and 114), multiple computer names will be returned in response to the series of probes, thus verifying the multiple user condition.

According to other such embodiments, information about connected machines may be directly acquired from a suspected MAC address. For example, the gateway may employ administrative messages to acquire such information. According to one such technique, the gateway transmits SNMP messages to the MAC address to read MIB variables which may include, for example, an actual list of MAC addresses of associated devices and/or the NAT table for translating those addresses to the suspected MAC address. Alternatively, a telnet session with the suspected device may be established to request specific information which could be indicative of the multiple user condition.

A multi-stage approach such as those described above may be advantageous in that the initial monitoring of connection counts may be done using less invasive techniques, thus minimizing the impact on system resources or latency experienced by users. Then, when a possible multiple user condition is detected, more intrusive measures, i.e., measures which are more consumptive of system resources or which introduce latency, may be employed to verify the detected condition. Of course, such a second stage of the process may not be necessary (as indicated by the dashed line from 210 to 218) where the confidence in the result at 210 is high, e.g., most or all of the passive flags have been set, or where verification of the condition is achieved in some other way, e.g., network personnel actually visits the access node location.

Regardless of the number of metrics used or the order in which they are used, once a multiple user condition is detected, gateway 104 may take any of a wide variety of actions (224). According to various embodiments, such actions can range from the very simple to the relatively complex. For example, a notification may be transmitted (e.g., via email, text messaging, pager, cell phone, etc.) to a network administrator who can then take appropriate action. Notifications could be sent locally on network 100 (e.g., to personnel at a hotel property), or to some remote location, e.g., service provider NOC 116, which may be connected to network 100 via the public Internet (105) or a private dedicated connection (e.g., a T1 or T3 line). Such a notification could identify the location, network, and network access node associated with the flagged MAC address, the estimated number of users, the appropriate corrective action, etc.

Alternatively, the gateway could terminate the session, preventing any further packets from the flagged MAC address from getting onto the network, e.g., the gateway could simply drop subsequent packets from that MAC address. Alternatively or in addition, in response to subsequent HTTP packets from that MAC address, the gateway could redirect the machine from which the packets originated to a web page which informs the user that service has been discontinued, and perhaps also provide contact information. Alternatively, the redirect could result in presentation of a page which informs the user that multiple users have been detected, and which gives the user the opportunity to purchase access to the network for the additional users. Similarly, for FTP traffic, messages could be sent back to the originating machines using the messaging mechanisms enabled by that protocol.

Other alternatives could involve automatically billing the originally authenticated user for the additional users, or to change the billing scheme from, for example, a flat rate to some usage based billing scheme.

While the invention has been particularly shown and described with reference to specific embodiments thereof, it will be understood by those skilled in the art that changes in the form and details of the disclosed embodiments may be made without departing from the spirit or scope of the invention. As discussed above, any one of the metrics and monitoring techniques described may be employed to detect multiple users sharing a single MAC address. On the other hand, the reliability of the detection may be potentially enhanced by using a combination of the metrics. It will be understood, however, that the combinations discussed herein are merely illustrative and that a large number of permutations of the described metrics (as well as similar metrics not explicitly described) may be employed without departing from the scope of the invention.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for detecting use of a network access node by multiple users to gain access to a network, comprising:
   receiving packets from a network device in communication with the network access node;
   evaluating the packets with reference to a plurality of metrics, each of the metrics being independently representative of an estimated number of user devices from which the packets originate that are using the network access node to gain access to the network; and determining that the estimated number of user devices using the network access node to gain access to the network exceeds an authorized number of user devices for the network access node with reference to a combination of the metrics.

2. The method of claim 1 wherein the plurality of metrics are associated with a particular MAC address, and comprises one or more of a number of TCP connections associated with the particular MAC address, a number of POP3 connections associated with the particular MAC address, a number of SMTP connections associated with the particular MAC address, a number of raw socket connections associated with the particular MAC address, a number of VPNs associated with the particular MAC address, a number of browser applications associated with the particular MAC address, a number of operating systems associated with the particular MAC address, a number of different cookies associated with the particular MAC address, or a number of different probe responses associated with the particular MAC address.

3. The method of claim 2 wherein the number of TCP connections, the number of POP3 connections, and the number of SMTP connections are each determined with reference to the particular MAC address, a TCP port number, and a destination IP address.

4. The method of claim 2 wherein the number of browser applications is determined with reference to the particular MAC address and one or more of HTML header information or HTTP header information.

5. The method of claim 2 wherein the number of cookies is determined by retrieving previously transmitted unique cookies from the user devices associated with the particular MAC address.

6. The method of claim 2 wherein the number of different probe responses is determined by transmitting a plurality of Netbios probes to the user devices associated with the particular MAC address.

7. The method of claim 2 wherein the number of TCP connections associated with the particular MAC address comprises concurrently open TCP connections.

8. The method of claim 1 wherein the each of the plurality of metrics in the combination of metrics has a weight associated therewith.

9. The method of claim 1 wherein the combination of metrics comprises fewer than all of the plurality of metrics.

10. The method of claim 1 wherein the plurality of metrics comprises first and second subsets, and wherein determining that the estimated number exceeds the authorized number comprises making a preliminary determination that the estimated number exceeds the authorized number with references to the first subset of metrics and, in response to the preliminary determination, making a final determination that the estimated number exceeds the authorized number with reference to the second subset of metrics.

11. The method of claim 10 wherein making the preliminary determination comprises tracking a number of connections for at least one type of traffic.

12. The method of claim 10 wherein making the final determination comprises detecting a plurality of different cookies associated with a particular MAC address.

13. The method of claim 1 further comprising generating a notification when the estimated number exceeds the authorized number.

14. The method of claim 13 wherein the notification comprises one or more of an email, a text message, a page, or a phone call.

15. The method of claim 13 wherein generating the notification comprises transmitting a message to personnel associated with the network.

16. The method of claim 13 wherein generating the notification comprises transmitting a message to a specific one of the estimated number of user devices associated with the network access node.

17. The method of claim 16 further comprising facilitating purchase of network access for at least some of the estimated number of user devices via the specific one of the user devices.

18. The method of claim 1 further comprising terminating access to the network by the network device when the estimated number exceeds the authorized number.

19. The method of claim 1 further comprising obtaining information from the network device relating to the user devices.

20. The method of claim 19 wherein obtaining information comprises reading addresses of the user devices stored on the network device.

21. A network, comprising:
a network access node for facilitating access to the network by a first network device;
a second network device which is operable to detect use of the network access node and the first network device by multiple users to gain access to the network, the second network device being operable to receive packets from the first network device via the network access node, and evaluate the packets with reference to a plurality of metrics, each of the metrics being independently representative of an estimated number of user devices from which the packets originate that are using the network access node to gain access to the network, the second network device further being operable to determine that the estimated number of user devices using the network access node to gain access to the network exceeds an authorized number of user devices for the network access node with reference to a combination of the metrics.

22. The network of claim 21 wherein the second network device comprises a gateway device, and wherein the network access node comprises one of a wireless access node and a wired access node.

23. The network of claim 21 wherein the first network device comprises one of a router and a proxy server.

* * * * *